(12) United States Patent
Addis

(10) Patent No.: US 8,727,353 B2
(45) Date of Patent: May 20, 2014

(54) COOLING ARRANGEMENT FOR BRUSH SEAL

(75) Inventor: Mark E. Addis, Kennebunk, ME (US)

(73) Assignee: United Technologies Corporation, Hartford, CT (US)

(*) Notice: Subject to any disclaimer, the term of this patent is extended or adjusted under 35 U.S.C. 154(b) by 587 days.

(21) Appl. No.: 11/398,237

(22) Filed: Apr. 5, 2006

(65) Prior Publication Data
US 2006/0181029 A1 Aug. 17, 2006

Related U.S. Application Data

(62) Division of application No. 10/064,681, filed on Aug. 6, 2002, now Pat. No. 7,052,015.

(51) Int. Cl.
F16J 15/02 (2006.01)

(52) U.S. Cl.
USPC .......................................... 277/355

(58) Field of Classification Search
USPC .......................................... 277/355
See application file for complete search history.

(56) References Cited

U.S. PATENT DOCUMENTS

| | | | | |
|---|---|---|---|---|
| 4,497,172 A | * | 2/1985 | Smith | 60/226.1 |
| 5,496,045 A | * | 3/1996 | Millener et al. | 277/355 |
| 5,799,952 A | * | 9/1998 | Morrison et al. | 277/355 |
| 6,402,157 B1 | * | 6/2002 | Zhou et al. | 277/355 |
| 6,533,284 B2 | * | 3/2003 | Aksit et al. | 277/355 |
| 7,059,827 B1 | * | 6/2006 | Ingistov | 415/170.1 |

FOREIGN PATENT DOCUMENTS

| | | |
|---|---|---|
| EP | 1229275 | 8/2002 |
| GB | 2258277 | 2/1992 |

* cited by examiner

Primary Examiner — Vishal Patel
(74) Attorney, Agent, or Firm — Bachman & LaPointe, P.C.

(57) ABSTRACT

A brush seal adapted to restrict a fluid flow through a gap between a first component and a second component, comprising: a body; a brush pack secured to the body; and a passage through the body for introducing a cooling flow to said gap. The passage has a first end that is exposed to the gap and a second end that is not exposed to the gap. The passage discharges a cooling flow to the brush seal, the cooling flow being discrete from the fluid flow.

7 Claims, 4 Drawing Sheets

COOLING ARRANGEMENT FOR BRUSH SEAL

CROSS-REFERENCE TO RELATED APPLICATION(S)

This application is a divisional application of U.S. patent application Ser. No. 10/064,681, filed Aug. 6, 2002, entitled COOLING ARRANGEMENT FOR BRUSH SEAL, By Mark E. Addis.

BACKGROUND OF THE INVENTION

This invention relates to brush seals. Specifically, this invention relates to cooling arrangements for brush seals.

New gas turbine engine designs typically increase efficiency by operating at higher temperatures. These higher operating temperatures affect, among other components, the brush seals used in these designs. As the operating temperatures increase, these higher operating temperatures may approach, or even surpass, the recommended temperature limits for the materials comprising the brush seal.

A related concern in brush seal design is the temperature of bristle tips. As the land surface of the runner rotates against the brush seal bristles, the friction therebetween creates heat. Excessive temperatures at the bristle tips caused by this friction can deteriorate the bristle tips and the land surface. Excessive bristle tip temperatures can also cause duck-footing or smearing of the bristles. Finally, excessive bristle tip temperatures can cause the bristles to fuse to the runner. These conditions can rapidly decrease the performance of the brush seal.

SUMMARY OF THE INVENTION

It is an object of the present invention to provide an improved brush seal.

It is a further object of the present invention to provide a brush seal that can operate at increased operating temperatures.

It is a further object of the present invention to provide a brush seal that limits bristle tip temperatures.

It is a further object of the present invention to provide a brush seal with a cooling arrangement.

These and other objects of the present invention are achieved in one aspect by a brush seal. The brush seal is adapted to restrict a fluid flow through a gap between a first component and a second component, and comprises: a body; a brush pack secured to said body; and a passage through said body for introducing a cooling flow to said gap. The passage has a first end that is exposed to said gap and a second end that is not exposed to said gap.

These and other objects of the present invention are achieved in another aspect by an apparatus, comprising: a first component; a second component; a brush seal mounted on said first component and contacting said second component, wherein said brush seal inhibits a fluid flow from passing between said first component and said second component; and an opening for discharging a cooling flow to said brush seal, said cooling flow discrete from said fluid flow.

These and other objects of the present invention are achieved in another aspect by a method of cooling a brush seal. The method comprises the steps of: providing a brush seal, first component and second component; placing said brush seal between said first component and said second component to inhibit a fluid flow from passing therebetween; and supplying a cooling flow to said brush seal.

BRIEF DESCRIPTION OF DRAWINGS

Other uses and advantages of the present invention will become apparent to those skilled in the art upon reference to the specification and the drawings, in which.

DETAILED DESCRIPTION

Figure 1:
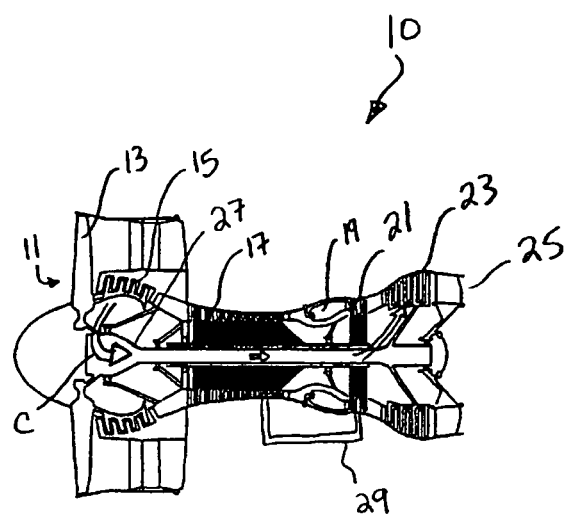
FIG. 1 is a cross-sectional view of a gas turbofan engine.

FIG. 1 displays a conventional gas turbofan engine 10. Starting at the upstream end, or inlet 11, the major components of the engine 10 include a fan section 13, a low pressure axial compressor 15, a high pressure axial compressor 17, a burner section 19, a high pressure turbine 21, a low pressure turbine 23, and a nozzle 25. Generally speaking, the engine 10 operates as follows. Air enters the engine 10 through the inlet 11, travels past the fan section 13 (which can be considered part of the compressor), becomes compressed by the compressors 15, 17, mixes with fuel, and combusts in the burner section 19. The gases from the burner section 19 drive the turbines 21, 23, then exit the engine 10 through the nozzle 25.

As designed, the engine 10 inducts more air than is necessary for complete combustion. This surplus allows for the use of a portion of the air to perform other functions. For example, the surplus air can drive accessories (not shown) such as air conditioning units, hydraulic pumps and thrust reverser actuators. In addition, removing surplus air can help avoid compressor surge. However, the main purpose of extracting air is for cooling the engine 10.

Cooling can occur by extracting surplus air from a cooler section of the engine 10 and delivering the extracted air to a hotter section of the engine 10. For example, the extraction could occur from the fan section 13 or the compressor sections 15, 17 to supply cooling air to the turbine sections 21, 23.

The extraction of surplus air can occur in two ways. First, the extracted air can travel internally through the engine 10. Second, the extracted air can travel externally from the engine 10. FIG. 1 shows both possibilities.

The internal cooling air path in FIG. 1 relies on a hollow shaft 27 connecting the low pressure compressor 15 and low pressure turbine 23. Air bleeds from the low pressure compressor 15, enters the shaft 27 through openings therein, exits the shaft 27 and arrives at the blades of the low pressure turbine 23.

Figure 2:
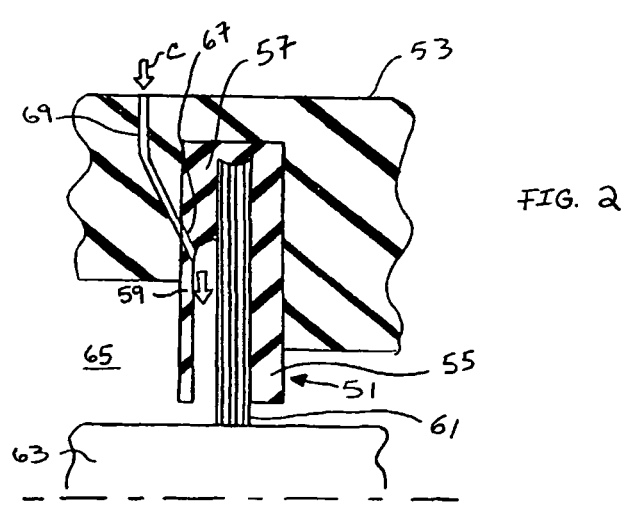
FIG. 2 is a partial cross-sectional view of one alternative embodiment of a brush seal cooling arrangement of the present invention.
Figure 3:
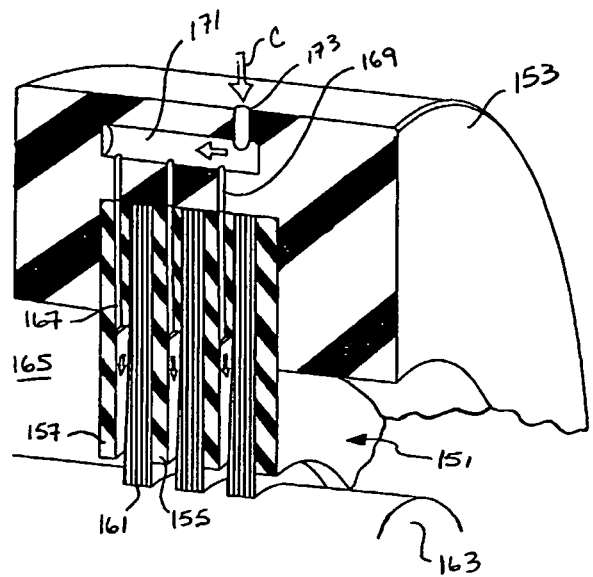
FIG. 3 is a perspective view, in partial cross-sectional, of another alternative embodiment of a brush seal cooling arrangement of the present invention.

The external cooling air path of FIG. 1 relies on a duct 29 adjacent the engine 10. Air bleeds from the high pressure compressor 17, enters the duct 29, travels through the duct 29 and arrives at the vanes of the high pressure turbine 21. The present invention utilizes one or both of these cooling paths to cool a brush seal. The cooling arrangement of the present invention allows the engine 10 to operate at elevated temperatures. FIGS. 2 and 3 each display a possible brush seal arrangement.

FIG. 2 displays a brush seal 51 mounted to a first component 53 of the engine 10. The brush seal 51 could mount to first component 53 using conventional techniques, for example with a removable flange (not shown). With the flange removed from the first component 53, the brush seal 51 could mount to a groove (not shown) in the first component 53. The flange is then fastened to the first component 53 to sandwich the brush seal 51 therebetween. The first component 53 is typically a stationary component of the engine 10, such as a diffuser case.

The brush seal 51 has a body, typically comprising a backing plate 55 and a side plate 57. The side plate 57 could include a windage cover 59. Alternatively, the windage cover 59 could comprise a separate piece from the side plate 57.

A brush pack 61 resides between the backing plate 55 and the side plate 57. A plurality of fine wire bristles comprise the brush pack 61. The brush pack 61 and the plates 55, 57 secure together using known techniques, such as by welding. Although the figures show the bristles extending radially within the engine 10, brush seals are also used to close gaps between upstream and downstream components. In this arrangement, the bristles preferably extend axially (not shown) within the engine.

The brush pack 61 engages a second component 63 of the engine 10. Depending upon the application (e.g. dynamic or static), the second component 63 could be a rotating component of the engine 10 (a dynamic application) or another stationary component of the engine 10 (a static application). Typically, the second component 63 is a rotating component, such as a turbine shaft.

Regardless of the brush seal 51 having a static or dynamic application, the purpose of the brush seal 51 is to restrict a fluid flow (e.g. air) through a gap 65 between the first component 53 and the second component 63.

The friction created by the metallic brush pack 61 engaging the metallic rotating component 63 of the engine 10 produces localized heating in dynamic applications. Excessive heat build-up in this area can deteriorate the bristle tips and the runner land surface. In addition, a high ambient temperature within the gap 65 between the first and second components 53, 63 can also deteriorate the brush pack 61 in both static and dynamic applications. The present invention can help control heat build-up at the bristle tips and help lessen the effects of high ambient temperature in the gap 65.

The body of the brush seal 51 can have a passageway 67 extending therethrough. The passageway can extend through any suitable part of the body of the brush seal 51. For the single stage brush seal shown in FIG. 2, the passageway 67 preferably extends through the side plate 57. The passageway 67 has an inlet at the front face of the side plate 57 and an outlet at the rear face of the side plate 57 adjacent the brush pack 61. If the side plate 57 includes a windage cover 59 (such as seen in FIG. 2), the passageway 67 could extend through the windage cover 59. The passageway 67 allows cooling air C to enter the gap 65 and to impinge upon the brush pack 61. The cooling air C helps reduce the heat build-up at the interface between the brush seal 51 and the second component 63 or reduce the high ambient temperature within the gap 65.

Preferably, the cooling air C originates from another location within the engine. In other words, the cooling air C is discrete from the fluid flow within the gap 65 between the first and second components 53, 63 of the engine 10. The cooling air C preferably should also exhibit a lower temperature than the fluid within the gap 65 to help reduce the aforementioned heat build-up.

The first component 53 helps the cooling air C arrive at the brush seal 51. The first component 53 has a passageway 69 therethrough. The passageway 69 is located so as to communicate with the passageway 67 of the brush seal 51. The cooling air, bled from another section of the engine 10 (such as the compressor 13, 15, 17), travels through the passageways 67, 69 and enters the gap 65. Using the arrangement shown in FIG. 1, the external duct 29 of the engine 10 could supply the cooling air C to the passageway 69. The external duct 29 bleeds air from the high pressure compressor 17. Other methods and sources of cooling air, however, could be used to supply the passageways 67, 69. Since the first component 53 surrounds the inlet of the passageway 67 and the passageway 69 communicates with the passageway 67, the inlet of the passageway 67 is not exposed to the gap 65 between the first and second components 53, 63 of the engine 10.

The passageways 67, 69 could have any suitable size that provides a sufficient amount of cooling air C to the brush seal 51. The passageways 67, 69 could also have shapes different than those shown in FIG. 2 in order to allow the cooling air C to impinge upon a desired location of the brush seal 51.

FIG. 3 displays a cooling arrangement for a multiple stage brush seal 151. The brush seal 151 operates in the same manner as the aforementioned brush seal 51. In other words, the brush seal 151 inhibits fluid flow through a gap 165 between a first component 153 and a second component 163.

Each stage of the brush seal 151 includes a backing plate 155, side plate 157 and brush pack 161. The backing plate 155 of each upstream stage serves as the windage cover 159 for the next downstream stage of the brush seal 151.

Each stage of the brush seal 151 also includes a passageway 167 to introduce cooling air C to the brush packs 161. Although shown as extending radially through the side plates 157, the passageways 167 could travel through any area of the brush seal body and could follow any desired path through the brush seal body.

The passageways 167 communicate with passageways 169 in the first component 153. A common header 171 in the first component 153 could supply the cooling air C to the passageways 169. A supply passageway 173 allows the cooling air C to enter the first component 153. Any other cooling air supply arrangement, however, could be used (such as individual supplies for each passageway 167).

Figure 4:
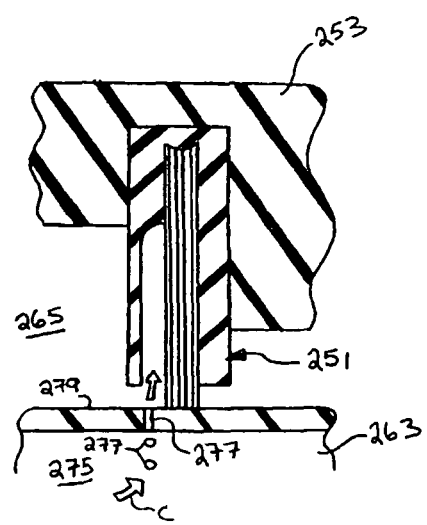
FIG. 4 is a cross-sectional view of another alternative embodiment of a brush seal cooling arrangement of the present invention.

FIG. 4 provides another embodiment of a brush seal arrangement. Similar to the aforementioned brush seals, brush seal 251 mounts to a first component 253 of the engine. The brush seal 251 extends from the first component 253 to engage a second component 263 of the engine 10. The brush seal 251 serves to restrict a fluid flow (e.g. air) through a gap 265 between the first component 253 and the second component 263.

Differently than the earlier embodiments, the second component 263 supplies the cooling air C to the brush seal 251. If, as seen in FIG. 4, the second component 263 is a turbine shaft, the shaft comprises a hollow interior 275 with passageways 277 extending through an outer wall 279 in a circumferential arrangement around the shaft.

The passageways 277 are located adjacent the interface between the brush seal 251 and the second component 263. Preferably, the passageways 277 are located upstream of such interface as seen in FIG. 4. Other arrangements, however, are possible (e.g. between stages of a multiple stage brush seal).

The passageways 277 could have any suitable size to provide a sufficient amount of the cooling air C to the interface between the brush seal 251 and the second component 263. Although shown as linear and a constant diameter, the passageways 277 could have any suitable shape or taper that allows the cooling air C to impinge upon a desired location of the brush seal 251.

Using the arrangement shown in FIG. 1, the cooling air C could bleed from another section of the engine 10 such as the compressor 13, 15, 17. The cooling air C would depart the compressor 13, 15, 17, travel through the turbine shaft, exit the passageways 277, and enter the gap 265 between the first and second components 253, 263 of the engine 10. Other methods and sources of cooling air, however, could be used to supply the passageways 277.

The present invention has been described in connection with the preferred embodiments of the various figures. It is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

The invention claimed is:

1. A system comprising:
a brush seal having a body;
a brush pack secured to said body;
said body including a backing plate and a side plate having a portion spaced from said brush pack and forming a gap therewith;
said side plate having a first face and a second face and a first fluid passageway having an inlet in said first face and an outlet in said second face for discharging a cooling fluid into said gap between said brush pack and said side plate, wherein said first and second faces each extend substantially parallel to a longitudinal axis of said brush pack;
a first engine component having a surface which abuts said first face and a second fluid passageway extending through said first engine component and forming a continuous fluid passageway with said first fluid passageway;
said second fluid passageway having an outlet in said surface of said first engine component;
said outlet of said second fluid passageway being in contact with the inlet of said first fluid passageway to form said continuous fluid passageway and for delivering cooling fluid from said second fluid passageway to said first cooling passageway; and
said brush pack having a first end which contact said body and a second end which contacts a surface of a second engine component.

2. The system of claim 1, wherein one of said engine components is a rotating component.

3. The system of claim 1, wherein said second fluid passageway extends solely within said first engine component.

4. The system of claim 1, wherein said second fluid passageway introduces cooling air discrete from fluid flowing within a gap between said first engine component and said second engine component.

5. The system of claim 1, wherein said first fluid passageway extends diagonally through said side plate.

6. A system comprising:
a brush seal having a body;
a brush pack secured to said body;
said body including a backing plate and a side plate having a portion spaced from said brush pack and forming a gap therewith;
said side plate having a first face and a second face and a first fluid passageway having an inlet in said first face and an outlet in said second face for discharging a cooling fluid into said gap between said brush pack and said side plate;
a first engine component having a surface which abuts said first face and a second fluid passageway extending through said first engine component and forming a continuous fluid passageway with said first fluid passageway;
said second fluid passageway having an outlet in said surface of said first engine component;
said outlet of said second fluid passageway being in contact with the inlet of said first fluid passageway to form said continuous fluid passageway and for delivering cooling fluid from said second fluid passageway to said first cooling passageway;
said brush pack having a first end which contact said body and a second end which contacts a surface of a second engine component; and
wherein said side plate has an integral windage cover located beneath the outlet of said first fluid passageway.

7. A system comprising:
a brush seal having a body;
a brush pack secured to said body;
said body including a backing plate and a side plate having a portion spaced from said brush pack and forming a gap therewith;
said side plate having a first face and a second face and a first fluid passageway having an inlet in said first face and an outlet in said second face for discharging a cooling fluid into said gap between said brush pack and said side plate;
a first engine component having a surface which abuts said first face and a second fluid passageway extending through said first engine component and forming a continuous fluid passageway with said first fluid passageway;
said second fluid passageway having an outlet in said surface of said first engine component;
said outlet of said second fluid passageway being in contact with the inlet of said first fluid passageway to form said continuous fluid passageway and for delivering cooling fluid from said second fluid passageway to said first cooling passageway;
said brush pack having a first end which contact said body and a second end which contacts a surface of a second engine component; and
a windage cover attached to said side plate, said windage cover being located below the outlet of said first fluid passageway.

* * * * *